United States Patent
Pink et al.

(10) Patent No.: US 10,648,828 B2
(45) Date of Patent: May 12, 2020

(54) METHOD AND APPARATUS FOR DETERMINING THE POSITION OF A VEHICLE

(71) Applicant: Robert Bosch GmbH, Stuttgart (DE)

(72) Inventors: Oliver Pink, Stuttgart (DE); Jan Sparbert, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 15/116,036

(22) PCT Filed: Dec. 2, 2014

(86) PCT No.: PCT/EP2014/076294
§ 371 (c)(1),
(2) Date: Aug. 2, 2016

(87) PCT Pub. No.: WO2015/113678
PCT Pub. Date: Aug. 6, 2015

(65) Prior Publication Data
US 2017/0167883 A1    Jun. 15, 2017

(30) Foreign Application Priority Data
Feb. 3, 2014    (DE) .......................... 10 2014 201 824

(51) Int. Cl.
*G01C 21/36* (2006.01)
*G01C 21/30* (2006.01)
(Continued)

(52) U.S. Cl.
CPC ......... *G01C 21/3602* (2013.01); *G01C 21/30* (2013.01); *G01C 22/00* (2013.01); *G06K 9/00798* (2013.01)

(58) Field of Classification Search
CPC . G01C 21/3602; G01C 21/30; G06K 9/00798
See application file for complete search history.

(56) References Cited

U.S. PATENT DOCUMENTS

| 5,893,043 A | 4/1999 | Moehlenbrink et al. |
| 9,767,693 B2 * | 9/2017 | Lee .......................... G08G 1/166 |

(Continued)

FOREIGN PATENT DOCUMENTS

| CN | 101641610 A | 2/2010 |
| CN | 102997926 A | 3/2013 |

(Continued)

OTHER PUBLICATIONS

International Search Report dated Mar. 2, 2015 for PCT/EP2014/076294, filed Dec. 2, 2014.

*Primary Examiner* — Hunter B Lonsberry
*Assistant Examiner* — Matthew Franklin Gordon
(74) *Attorney, Agent, or Firm* — North Rose Fulbright US LLP; Gerard Messina

(57) ABSTRACT

A method for determining the position of a vehicle, including sensing of multiple objects in a surround field of the vehicle, detecting a sequence of the multiple sensed objects in a digital map and determining a position of the vehicle in the digital map based on a position of the detected sequence in the digital map. An apparatus for determining the position of a vehicle, as well as to a computer program are also described.

23 Claims, 2 Drawing Sheets

(51) Int. Cl.
*G06K 9/00* (2006.01)
*G01C 22/00* (2006.01)

(56) References Cited

U.S. PATENT DOCUMENTS

| | | | | |
|---|---|---|---|---|
| 2004/0044477 | A1* | 3/2004 | Jung | G01C 21/30 |
| | | | | 702/5 |
| 2006/0111827 | A1* | 5/2006 | Russlies | H03G 3/32 |
| | | | | 701/49 |
| 2006/0210164 | A1* | 9/2006 | Hideyuki | G06K 9/38 |
| | | | | 382/190 |
| 2009/0228204 | A1 | 9/2009 | Zavoli et al. | |
| 2010/0010734 | A1* | 1/2010 | Liu | G01C 21/3492 |
| | | | | 701/533 |
| 2012/0271540 | A1* | 10/2012 | Miksa | G01C 21/30 |
| | | | | 701/409 |
| 2014/0019005 | A1 | 1/2014 | Lee et al. | |
| 2014/0327772 | A1* | 11/2014 | Sahba | G06K 9/00818 |
| | | | | 348/148 |

FOREIGN PATENT DOCUMENTS

| | | |
|---|---|---|
| CN | 103105168 A | 5/2013 |
| DE | 19532104 | 1/1997 |
| DE | 102005044981 | 3/2007 |
| DE | 102009039450 | 5/2010 |
| DE | 102012013492 | 1/2013 |
| DE | 102011088134 | 6/2013 |
| TW | 201116805 A | 5/2011 |
| WO | 0166401 | 9/2001 |

\* cited by examiner

METHOD AND APPARATUS FOR DETERMINING THE POSITION OF A VEHICLE

FIELD

The present invention relates to a method and an apparatus for determining the position of a vehicle. The present invention also relates to a computer program.

BACKGROUND INFORMATION

Conventionally, a vehicle may be localized by way of a satellite-supported GPS system. However, this type of localization is not always available. For example, high buildings or tunnel passages may lead to a blocking of the satellite signal. Localization is then only possible to a limited extent or not at all.

SUMMARY

An object of the present invention is to provide an improved method for determining the position of a vehicle which overcomes the familiar disadvantages and makes it possible to determine the position of the vehicle even when a satellite signal of a GPS system is available only to a limited extent or not at all.

In addition, an object of the present invention is to provide a corresponding apparatus for determining the position of a vehicle.

Furthermore, an object of the present invention is to provide a corresponding computer program.

According to one aspect of the present invention, a method is provided for determining the position of a vehicle, including the following steps:
Sensing of multiple objects in a surround field of the vehicle,
Detecting a sequence of the multiple sensed objects in a digital map and
Determining a position of the vehicle in the digital map based on a position of the detected sequence in the digital map.

According to a further aspect, an apparatus is provided for determining the position of a vehicle, including:
a sensing device for sensing multiple objects in a surround field of the vehicle,
a detection device for detecting a sequence of the multiple sensed objects in a digital map and
a determination device for determining a position of the vehicle in the digital map based on a position of the detected sequence in the digital map.

According to another aspect, a computer program is provided which includes program code for carrying out the method to determine a position of a vehicle when the computer program is executed on a computer.

Thus, in accordance with the present invention, multiple objects in the surround field of the vehicle are sensed, and a sequence of the multiple sensed objects are search for in a digital map. If this sequence is found in the digital map, a position of the vehicle in the digital map may be determined based on the position of the detected sequence in the digital map. Thus, determining or pinpointing the position of the vehicle is advantageously facilitated even when no satellite signal of a GPS satellite is available. Consequently, localizing or determining the position of the vehicle is advantageously enabled, even in a tunnel. In particular, blocking by a high building does not result in the vehicle no longer being able to be localized.

Thus, the present invention may ensure position determination of the vehicle with very high availability. This especially when the vehicle is traveling through a tunnel or through a city with high buildings, in the forest or in low mountain valleys, or in parking garages, for generally, a satellite signal for a GPS position finding is available only to a limited extent or not at all in these environments.

In addition, great robustness with regard to sensing the multiple objects is ensured. Thus, the objects may also be sensed during bad weather, by day and by night. In particular, this is accomplished with the aid of a video camera or a lidar sensor, as well as radar and ultrasound. In contrast, a satellite signal is only available to a limited extent or not at all during bad weather.

Moreover, pinpointing is very precise, especially up to an accuracy of 5 cm.

Notably, the invention may be implemented inexpensively. This is especially so when a sensor device already available in the vehicle may be used.

Moreover, the present invention permits a non-slip determination of a linear velocity. In particular, this may be used to calibrate wheel-speed sensors, for example, and/or an inertial sensor system. Inertial sensors commonly have slowly changing or static errors such as offsets or drifts (e.g., temperature-sensitive electronics or perhaps as a function of the situation, for example, road gradient, cross wind). By comparing the internal estimation of a longer linear movement based on the inertial sensor system, to the absolute movement from the mapped data, it is possible to infer these error quantities from the deviation.

For example, a sequence within the meaning of the present invention may be a time sequence and/or locational sequence. Locational means especially with respect to a specific location or position of the objects. Time means, in particular, with respect to a travel time and/or a specific moment or instant the objects are sensed. In particular, a locational sequence may be specific to a direction of travel. That means especially that a locational sequence may thus be a succession or sequence of objects along a road section based on a direction of travel of the vehicle. For example, a time sequence may be a chronological sequence of the respective moments or instants the objects are sensed.

According to one specific embodiment, to detect the sequence in the digital map, a quantity of identical objects of the multiple sensed objects may be determined, and the detection of the sequence includes detecting the quantity of identical objects in the digital map. This especially between two reference points. That is, the identical objects are thus specifically counted between two reference points.

In this way, an especially easy possibility is advantageously provided to detect the sequence in the digital map. Advantageously, only a small computing capacity is thus needed. Suitable processing steps may be executed quickly on a processing module or a computer. This is especially important for real-time applications.

In particular, the determination of a quantity may also be referred to as counting. This means expressly that, for example, the identical objects are thus counted, and this quantity is searched for in a digital map. This especially between two reference points. For example, such reference points may be the same or different. A reference point may be an intersection, for instance, a freeway entrance, a freeway exit, an intersecting road or an object.

According to one specific embodiment, the digital map may include information about a position or location and/or a quantity of identical objects between two reference points or reference locations.

According to a further specific embodiment, a specific size of the identical objects may be determined, the sizes in each case being compared to a reference size, and the quantity including only the identical objects whose determined size corresponds to the reference size.

In this manner, counting errors may advantageously be avoided, for only the objects are counted whose size corresponds to the reference size. This advantageously allows for a comparison to determine whether the identical objects are indeed identical objects.

In another specific embodiment, it may be checked whether the identical objects belong to an object class whose elements are disposed periodically along a road section, the determined quantity of identical objects being verified based on the periodicity of the disposition of the elements of the object class.

If an object was sensed at a place or a location, but according to the periodicity, no object should be there, then this object is not counted. The determined quantity is corrected downward, in the case of one object, that means −1. In the case of several objects, correspondingly, minus the several objects.

If no object was sensed at a place or a location, but according to the periodicity, an object should be there, the object not sensed is then nevertheless counted. The determined quantity is corrected upward, in the case of one object, accordingly +1. In the case of several objects, correspondingly, plus the several objects.

Consequently, for example, absences of markings may be recognized and taken into consideration in a count, since a constant frequency is given based on the periodicity. Compensation may advantageously be made for sensor weaknesses or sensor malfunctions. This produces a more robust count. As a result, more robust detection in the digital map and, in this respect, a more robust and improved position determination are ensured.

According to another specific embodiment, it may be checked whether the identical objects belong to an object class whose elements are disposed periodically along a road section, a distance traveled by the vehicle being estimated based on the quantity of identical objects and the periodicity of the disposition of the elements of the object class.

This specific embodiment is an especially simple way of estimating a distance traveled, for it is sufficient to multiply a distance between the objects by the quantity of objects. The distance between the objects is fixed based on the periodicity.

Particularly if an absolute position (or world position) of the vehicle is known prior to the counting, a new absolute position, e.g., in the digital map, may be determined accordingly based on the absolute position and the distance traveled.

According to a further specific embodiment, the objects may be elements selected from the following group of objects: lane marking, interrupted lane marking, interruption of an interrupted lane marking, reflector posts, bridge piles, posts of a toll bridge, posts of a guardrail, house windows, front doors, lamp posts, signposts, driveways and streets. In particular, a reference point may be one of the above-mentioned objects.

The aforesaid objects are typical objects frequently located on a road or a road section. Generally, they are easy to sense and to classify. The present invention may be implemented or carried out particularly easily based on the above-mentioned objects.

In a further specific embodiment, it may be provided that while the vehicle is traveling on a road section, the sensing of multiple objects in a surround field of the vehicle includes sensing of interrupted lane markings, the interrupted lane markings being counted to determine a quantity of the interrupted lane markings, the detection of the sequence of interrupted lane markings in the digital map including detection of an equal quantity of interrupted lane markings in the digital map, the equal quantity corresponding to the quantity of the interrupted lane markings counted.

Advantageously, an especially precise localization of the vehicle is thereby brought about. In particular, a beginning and an end of a marking may be sensed while the vehicle is traveling. Notably, an accuracy to, e.g., 5 cm is thereby produced. Instead of or in addition to the lane marking, in particular, the interruptions of the interrupted lane markings may also be counted.

According to another specific embodiment, only those interrupted lane markings may be counted whose length corresponds to a defined reference length.

In this manner, counting errors may advantageously be avoided.

According to one specific embodiment, during the mapping, a measure was stored for the quality and/or for the recognizability of the objects. That is, in particular, according to one specific embodiment, the digital map thus includes a measure for the quality and/or for the recognizability of the objects or such a measure is stored in the digital map. Particularly upon the recognition of an object, this measure is re-ascertained, the newly ascertained measure being compared to the stored measure. Since it is to be expected that the measure for the quality and/or the recognizability stored in the map and the re-ascertained measure are equal, in the event they don't agree, the difference between both measures may be utilized to check the plausibility of the position estimation. In the same way, in the event an object is not recognized, the measure stored in the map may be utilized to check plausibility: If an easily recognizable object (thus having a higher measure in comparison to poorly recognizable objects) is not recognized, this points to an implausible position determination, whereas the non-recognition of an object poorly recognizable, for example, because of aging or soiling (thus, with a lower measure in comparison to easily recognizable objects) is to be expected and allows no statement about the plausibility. From this, a reliability and/or the validity of the estimate may advantageously be deduced; for example, a greater stored measure and a greater ascertained measure signifies a greater reliability of the estimate, and a greater agreement of the measures signifies a greater validity of the estimate.

In another specific embodiment, with the aid of a position sensor of the vehicle, a position of the vehicle in the world may be determined, and based on the world position and the position determined in the digital map, a further position of the vehicle is determined in the digital map.

For example, a navigation system may include such a position sensor. In particular, a plurality of position sensors may be provided. The plurality of position sensors may specifically be the same or different, for example. The position sensor may be a GPS sensor, for instance. "GPS" here stands for "Global Positioning System." For instance, the position sensor may be a GLONASS sensor. The position sensor may be a Galileo position sensor, for example. The position sensor may, for instance, be a compass position sensor.

Because both the world position and the position determined in the digital map are used to determine the further position, advantageously a higher accuracy may be achieved in pinpointing or determining the position of the vehicle in the digital map. In particular, the further position may be formed based on a fusion of the world position or the determined position.

According to a further specific embodiment, the sensing device may include one or more sensors. These sensors are designed expressly to sense one object or multiple objects in a surround field of the vehicle. Therefore, these sensors may be denoted especially as surround-field sensors. If several sensors should be provided, they may specifically be the same or preferably different. For example, the sensor, or more precisely, the surround-field sensor may be an optical surround-field sensor: for instance, may be a video sensor, especially a video sensor of a video camera, a lidar sensor or a sensor of what is referred to as a range imager. In particular, such a range imager is a system including a video sensor, the system being able to provide distance information concerning sensed objects.

For example, the surround-field sensor may take the form of a laser sensor, a radar sensor or an ultrasonic sensor.

According to one specific embodiment, the detection device and/or the determination device may be included by a processing device, especially a computer. For instance, a processor of the processing device or of the computer may effect or provide the functionalities of the detection device and/or of the determination device.

According to a further aspect, a vehicle is provided that includes the apparatus for determining the position of a vehicle.

According to one specific embodiment, a sensor may be mounted to the side of a longitudinal axis of the vehicle. In particular, a plurality of sensors may be mounted to the side of the longitudinal axis of the vehicle. That means in particular that the sensor or sensors is/are disposed on the left side or right side of the vehicle. They are thereby situated closer to a lane marking in comparison to a sensor that is aligned forward as viewed in the direction of travel. As a result, other vehicles in the surround field of the vehicle can no longer interfere with the sensing by the laterally mounted sensor, for other vehicles in the surround field of the vehicle may hide lane markings or other objects, for example, so that sensors which are aligned forward in the direction of travel are no longer able to sense these hidden lane markings or objects.

In this manner, advantageously the objects, especially lane markings in the surround field of the vehicle are reliably sensed or detected.

The present invention is described in greater detail below on the basis of preferred exemplary embodiments.

DETAILED DESCRIPTION OF EXAMPLE EMBODIMENTS

Figure 1:
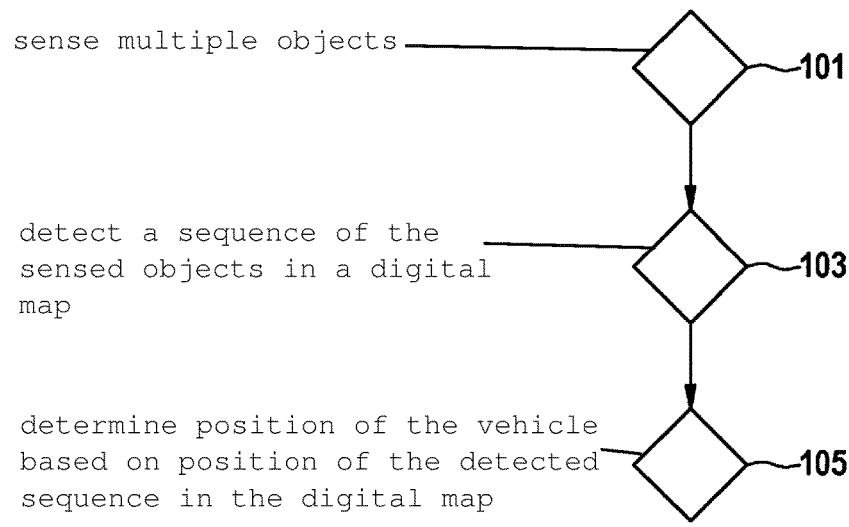
FIG. 1 shows a flowchart of a method for determining the position of a vehicle.

FIG. 1 shows a flowchart of a method for determining the position of a vehicle.

According to a step 101, multiple objects are sensed in a surround field of the vehicle. In a step 103, a sequence of the multiple sensed objects is detected in a digital map. According to a step 105, a position of the vehicle in the digital map is determined based on a position of the detected sequence in the digital map.

Figure 2:
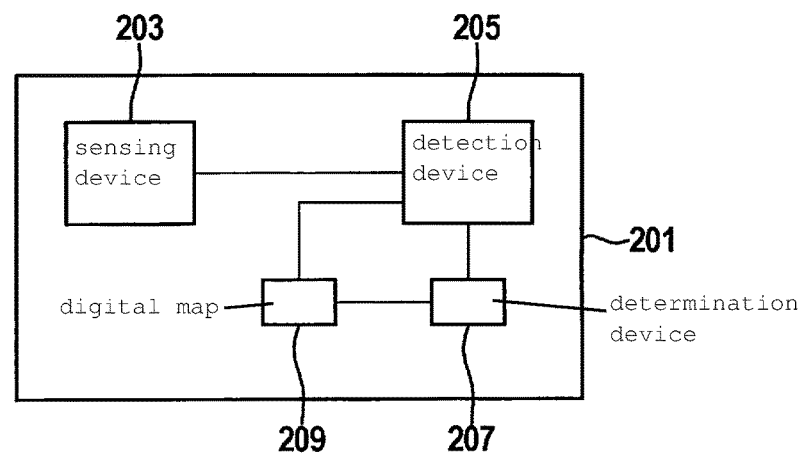
FIG. 2 shows an apparatus for determining the position of a vehicle.

FIG. 2 shows an apparatus 201 for determining the position of a vehicle (not shown).

Apparatus 201 includes a sensing device 203 for sensing multiple objects in a surround field of the vehicle. Apparatus 201 also includes a detection device 205 for detecting a sequence of the multiple sensed objects in a digital map 209. In addition, apparatus 201 includes a determination device 207 for determining a position of the vehicle in digital map 209 based on a position of the detected sequence in digital map 209. In a specific embodiment not shown, apparatus 201 does not include digital map 209.

Figure 3:
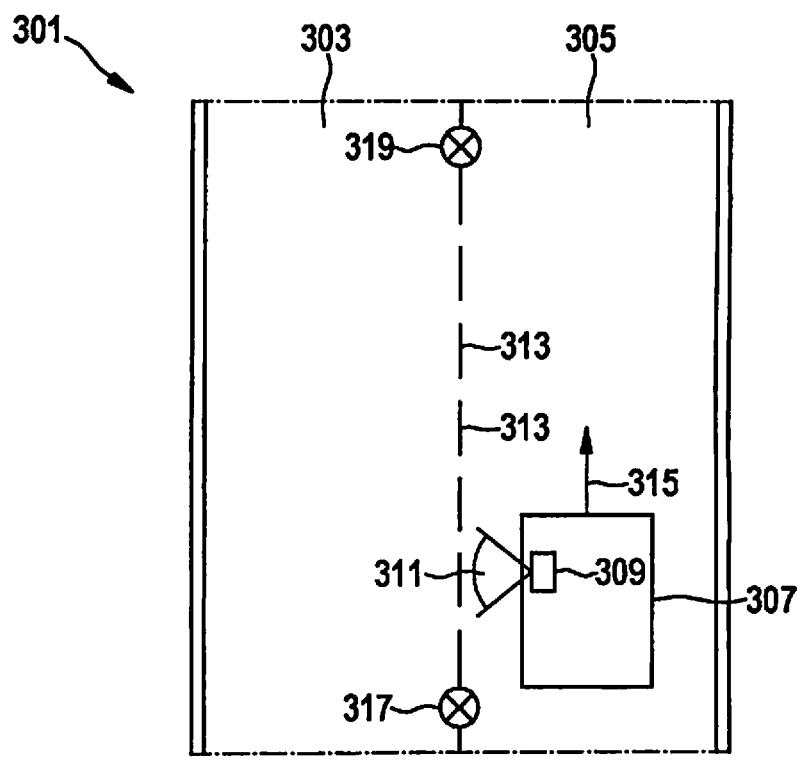
FIG. 3 shows a road on which a vehicle, including an apparatus for determining the position of a vehicle, is traveling.

FIG. 3 shows a road 301 on which a vehicle 307 is moving in direction of travel 315, identified by an arrow.

Road 301 includes two traffic lanes 303 and 305, which run parallel to each other. The two traffic lanes 303 and 305 are separated visually from each other by interrupted lane markings 313. Vehicle 307 is traveling in right traffic lane 305. Right here relates to the plan view of the drawing according to FIG. 3.

Vehicle 307 includes an apparatus for determining the position of a vehicle, which for the sake of the overall view, is not shown in its entirety with all elements. For example, this apparatus may be apparatus 201 according to FIG. 2. However, a surround-field sensor 309 is sketched in that is mounted on the left side of the vehicle. Surround-field sensor 309 is designed to sense interrupted lane markings 313. This sensing is indicated symbolically by a sensing angle having reference numeral 311.

While vehicle 307 is traveling in direction of travel 315 along traffic lane 305, surround-field sensor 309 is sensing interrupted lane markings 313. Lane markings 313 are counted between a beginning reference point having reference numeral 317 and an end reference point having reference numeral 319. Thus, specifically, a quantity of lane markings 313 is determined between the two reference points 317 and 319. For example, the two reference points 317 and 319 may be a particular exit from a freeway or, for instance, a further intersecting roadway or street. Any reference points may be used.

It is only important that the digital map also includes these reference points. In particular, the digital map must include the information as to how many interrupted lane markings 313 exist between the two reference points 317 and 319.

Advantageously, the two reference points 317 and 319 and the counted quantity of lane markings 313 may then be searched for in the digital map. When this sequence of lane markings 313 has been found in the digital map, then the information is available that the vehicle must be located in the digital map between these two reference points 317 and 319. Consequently, a position of the vehicle in the digital map is thus determined in advantageous manner. In particular, this position may be matched or compared with the aid of a world position, so that based on the world position of the vehicle and the determined position, a further position of the vehicle may be determined in the digital map.

For this purpose, the vehicle may especially include a position sensor.

Thus, in particular, a localization or position determination is supplemented with the aid of a position sensor to the effect that a complementary sensor for attaining the objective, here surround-field sensor 309, is available to determine the position of the vehicle in a digital map. Even if both sensors are not available simultaneously or not always to the same extent, an adequate position determination is nevertheless made possible, for as a rule, at least one of the two sensors is available for determining position. If both sensors are available to the full extent, accuracy may be produced by comparison or fusion of the correspondingly determined positions.

According to one specific embodiment, in the gap or in the interruption between two lane markings 313, a prediction may be carried out that, in particular, is based on an inertial sensor system of the vehicle. For this, a speed and/or an acceleration and/or a yaw rate of the vehicle, for instance, may be used for the prediction, Thus, even in the gap in which no lane marking 313 is able to be sensed, it is possible to estimate what speed, what acceleration and/or what yaw rate the vehicle has.

Therefore, according to one specific embodiment, a vehicle is localized by the counting of interrupted lane markings and/or the interruptions of the lane markings and by comparison to a digital map, information about the position of the interrupted lane markings and/or their quantity between two reference points being contained in the digital map. In particular, the sensorial determination of the lane markings may be carried out via an optical surround-field sensor which, for instance, may already be available in the vehicle. The surround-field sensor may especially be situated in the front area and/or specifically in the side area of the vehicle. To increase robustness, a further sensor may be used, for example, which is closer to the lane markings than other sensors of the vehicle, thus permitting reliable detection.

In one specific embodiment, other objects able to be counted or sensed on a road may also be used, like reflector posts, bridge piles, posts of toll bridges, posts of guardrails, for example.

In particular, that means that the objects, especially the markings, in one specific embodiment are counted and compared to a corresponding quantity from a digital map for the partial route in question; a partial route may be a route between two exits, for instance.

One specific embodiment may get along without a digital map, for instance, and estimate a route covered or a distance traveled on the basis of structural requirements (in Germany, for example, guidelines for the marking of roads (RMS)). In this case, use is specifically made of the circumstance that objects able to be counted are frequently mounted at fixed intervals. For example, reflector posts on freeways are disposed with a separation of 50 m or 100 m. In particular, lane markings on freeways have a spacing of 18 m, for example.

What is claimed is:

1. A method for determining the position of a vehicle, comprising:
   sensing, using a sensor of the vehicle, multiple objects in a surround field of the vehicle, the objects including at least one of: a lane marking, an interrupted lane marking, an interruption of an interrupted lane marking, a reflector post, a bridge pile, a post of a toll bridge, or a post of a guardrail;
   counting, using a processor, identical sensed objects of the multiple sensed objects to determine a quantity of the identical sensed objects, wherein sizes of the identical sensed objects are determined, the sizes in each case being compared to a reference size, and the counting includes in the determined quantity only the identical sensed objects whose determined sizes correspond to the reference size;
   detecting, using the processor, a sequence of objects corresponding to the multiple sensed objects in a digital map, the sequence including the determined quantity of the corresponding objects; and
   determining, using the processor, a position of the vehicle in the digital map based on a position of the detected sequence in the digital map.

2. The method as recited in claim 1, further comprising:
   checking whether the identical sensed objects belong to an object class whose elements are disposed periodically along a road section, the determined quantity of identical sensed objects being verified based on the periodicity of the disposition of the elements of the object class.

3. The method as recited in claim 1, further comprising:
   checking whether the identical sensed objects belong to an object class whose elements are disposed periodically along a road section, a distance traveled by the vehicle being estimated based on the quantity of identical sensed objects and the periodicity of the disposition of the elements of the object class.

4. The method as recited in claim 1, wherein while the vehicle is traveling on a road section, the sensing of multiple objects in a surround field of the vehicle includes sensing of interrupted lane markings, the sensed interrupted lane markings being counted to determine a quantity of the sensed interrupted lane markings, the detection of the sequence of interrupted lane markings in the digital map including detection of an equal quantity of interrupted lane markings in the digital map, the equal quantity corresponding to the quantity of sensed interrupted lane markings counted.

5. The method as recited in claim 4, wherein only those sensed interrupted lane markings are counted whose length corresponds to a defined reference length.

6. The method as recited in claim 1, wherein a position of the vehicle in the world is determined with the aid of a position sensor of the vehicle, and based on the world position and the position determined in the digital map, a further position of the vehicle is determined in the digital map.

7. An apparatus for determining the position of a vehicle, comprising:
   a sensing device for sensing multiple objects in a surround field of the vehicle, the objects including at least one of: a lane marking, an interrupted lane marking, an interruption of an interrupted lane marking, a reflector post, a bridge pile, a post of a toll bridge, or a post of a guardrail;
   a counting device for counting identical sensed objects of the multiple sensed objects to determine a quantity of the identical sensed objects, wherein sizes of the identical sensed objects are determined, the sizes in each case being compared to a reference size, and the counting includes in the determined quantity only the identical sensed objects whose determined sizes correspond to the reference size;
   a detection device for detecting a sequence of objects corresponding to the multiple sensed objects in a digital map, the sequence including the determined quantity of the corresponding objects; and a determination device for determining a position of the vehicle in the digital map based on a position of the detected sequence in the digital map.

8. A non-transitory computer readable storage medium storing a computer program for determining the position of a vehicle, the computer program, when executed by a computer, causing the computer to perform:

causing a sensing, using a sensor of the vehicle, multiple objects in a surround field of the vehicle, the objects including at least one of: a lane marking, an interrupted lane marking, an interruption of an interrupted lane marking, a reflector post, a bridge pile, a post of a toll bridge, or a post of a guardrail;

counting identical sensed objects of the multiple sensed objects to determine a quantity of the identical sensed objects, wherein sizes of the identical sensed objects are determined, the sizes in each case being compared to a reference size, and the counting includes in the determined quantity only the identical sensed objects whose determined sizes correspond to the reference size;

detecting a sequence of objects corresponding to the multiple sensed objects in a digital map, the sequence including the determined quantity of the corresponding objects; and determining a position of the vehicle in the digital map based on a position of the detected sequence in the digital map.

9. The non-transitory computer readable storage medium as recited in claim 8, wherein while the vehicle is traveling on a road section, the sensing of multiple objects in a surround field of the vehicle includes sensing of interrupted lane markings, the sensed interrupted lane markings being counted to determine the quantity of the sensed interrupted lane markings, the detection of the sequence of interrupted lane markings in the digital map including detection of an equal quantity of interrupted lane markings in the digital map, the equal quantity corresponding to the quantity of sensed interrupted lane markings counted.

10. The non-transitory computer readable storage medium as recited in claim 8, wherein the sensor includes at least one of: a camera, a lidar sensor, or a range imager.

11. The apparatus as recited in claim 7, wherein while the vehicle is traveling on a road section, the sensing of multiple objects in a surround field of the vehicle includes sensing of interrupted lane markings, the sensed interrupted lane markings being counted to determine the quantity of the sensed interrupted lane markings, the detection of the sequence of interrupted lane markings in the digital map including detection of an equal quantity of interrupted lane markings in the digital map, the equal quantity corresponding to the quantity of sensed interrupted lane markings counted.

12. The apparatus as recited in claim 7, wherein the sensing device includes at least one of: a camera, a lidar sensor, or a range imager.

13. The method as recited in claim 1, wherein the sensor includes at least one of: a camera, a lidar sensor, or a range imager.

14. The method as recited in claim 1, wherein the identical sensed objects are counted from a beginning reference point to an end reference point in the surround field of the vehicle.

15. The method as recited in claim 14, further comprising:
detecting, using the processor, two reference points corresponding to the beginning reference point and the end reference point in the digital map.

16. The method as recited in claim 14, wherein the beginning reference point and the end reference point are each at least one of: an intersection, a freeway entrance, a freeway exit, or an intersecting road.

17. The method as recited in claim 1, further comprising:
determining, using the processor, a second position of the vehicle using a position sensor; and
determining, using the processor, a third position of the vehicle based on the determined position of the vehicle in the digital map and on the determined second position of the vehicle.

18. The method as recited in claim 1, further comprising:
sensing, using the sensor, an interruption of the sensed multiple objects; and
determining, using the processor, a position of the vehicle for an area of the interruption of the sensed multiple objects based on an output of an inertial sensor.

19. The method as recited in claim 1, further comprising:
calibrating at least one of: a wheel speed sensor, or an inertial sensor;
wherein the calibrating is performed based on comparing a movement detected by the wheel speed sensor or the inertial sensor to a movement determined based on the determined position of the vehicle in the digital map.

20. The method as recited in claim 1, wherein the counting includes:
for an instance where at least one of the multiple objects is sensed where none of the multiple objects should be based on a periodicity of the multiple objects, not including the at least one of the multiple objects in the determined quantity.

21. The method as recited in claim 1, wherein the counting includes:
for an instance where none of the multiple objects are sensed where at least one of the multiple objects should be based on a periodicity of the multiple objects, including the at least one of the multiple objects in the determined quantity.

22. The method as recited in claim 1, wherein the determining the position of the vehicle in the digital map is based on a periodicity of the sensed identical objects.

23. The method as recited in claim 1, wherein a periodicity of the sensed identical objects determined based on the sensed identical objects is compared to a reference periodicity contained in the digital map.

* * * * *